Dec. 6, 1927.  
F. McF. BRINCKERHOFF  
1,651,580  
SIDE BEARING FOR ARTICULATED CARS  
Filed March 21, 1927 3 Sheets-Sheet 1

Dec. 6, 1927.

F. McF. BRINCKERHOFF 1,651,580

SIDE BEARING FOR ARTICULATED CARS

Filed March 21, 1927 3 Sheets-Sheet 2

WITNESS

INVENTOR
Francis McF. Brinckerhoff

Dec. 6, 1927. 1,651,580
F. McF. BRINCKERHOFF
SIDE BEARING FOR ARTICULATED CARS
Filed March 21, 1927  3 Sheets-Sheet 3
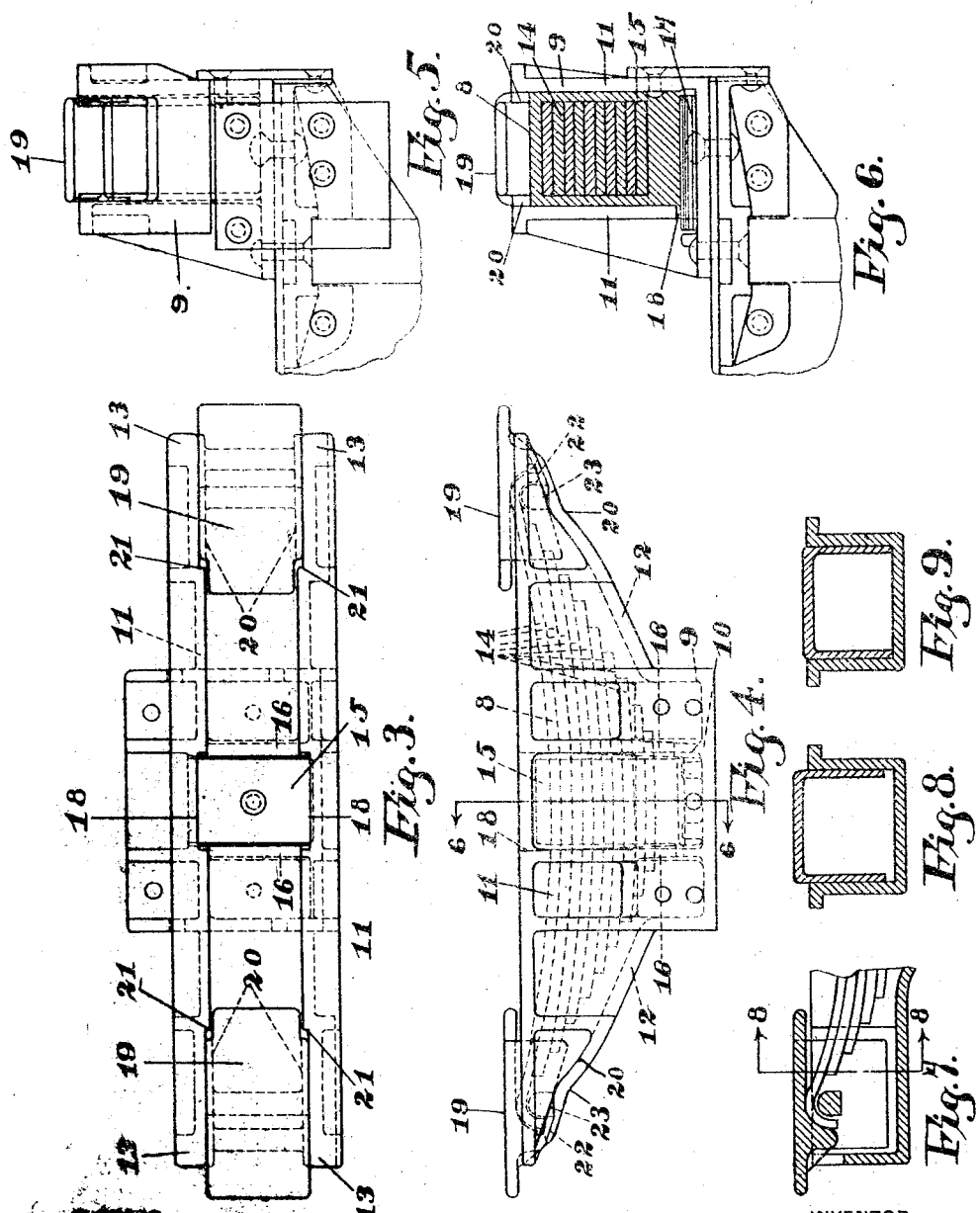
INVENTOR
Francis McF. Brinckerhoff Patented Dec. 6, 1927.

1,651,580

UNITED STATES PATENT OFFICE.

FRANCIS McF. BRINCKERHOFF, OF SUFFERN, NEW YORK, ASSIGNOR TO PRESSED STEEL CAR COMPANY, OF PITTSBURGH, PENNSYLVANIA, A CORPORATION OF NEW JERSEY.

SIDE BEARING FOR ARTICULATED CARS.

Application filed March 21, 1927. Serial No. 176,866.

This invention relates to transportation cars and particularly to railway cars of the articulated unit type in which each unit comprises a plurality of car bodies, the adjacent ends of two of which are carried by a single truck, and has for an object the provision of side supports or bearings between the truck and the adjacent ends of two of the bodies of a car unit.

Another object of the invention is to provide a side bearing for articulated cars which comprises a resilient member adapted to engage the car truck and adjacent ends of two of the bodies of a car unit.

Another object of the invention is to provide a side bearing for an articulated car comprising a resilient member mounted on a truck and loosely engaging the adjacent ends of two of the bodies of the car.

A further object of the invention is to provide a side bearing for an articulated car which comprises a member extending between and at its ends engaging the adjacent ends of two bodies of the car and between its ends engaging an adjacent car truck.

A further object of the invention is to provide a side bearing for the adjacent ends of two bodies of an articulated car having a resilient portion adapted to be engaged by said ends under normal service conditions, and having a rigid portion adapted to be engaged by said ends in the event of the breakage or failure of said resilient portion.

Figure 1:
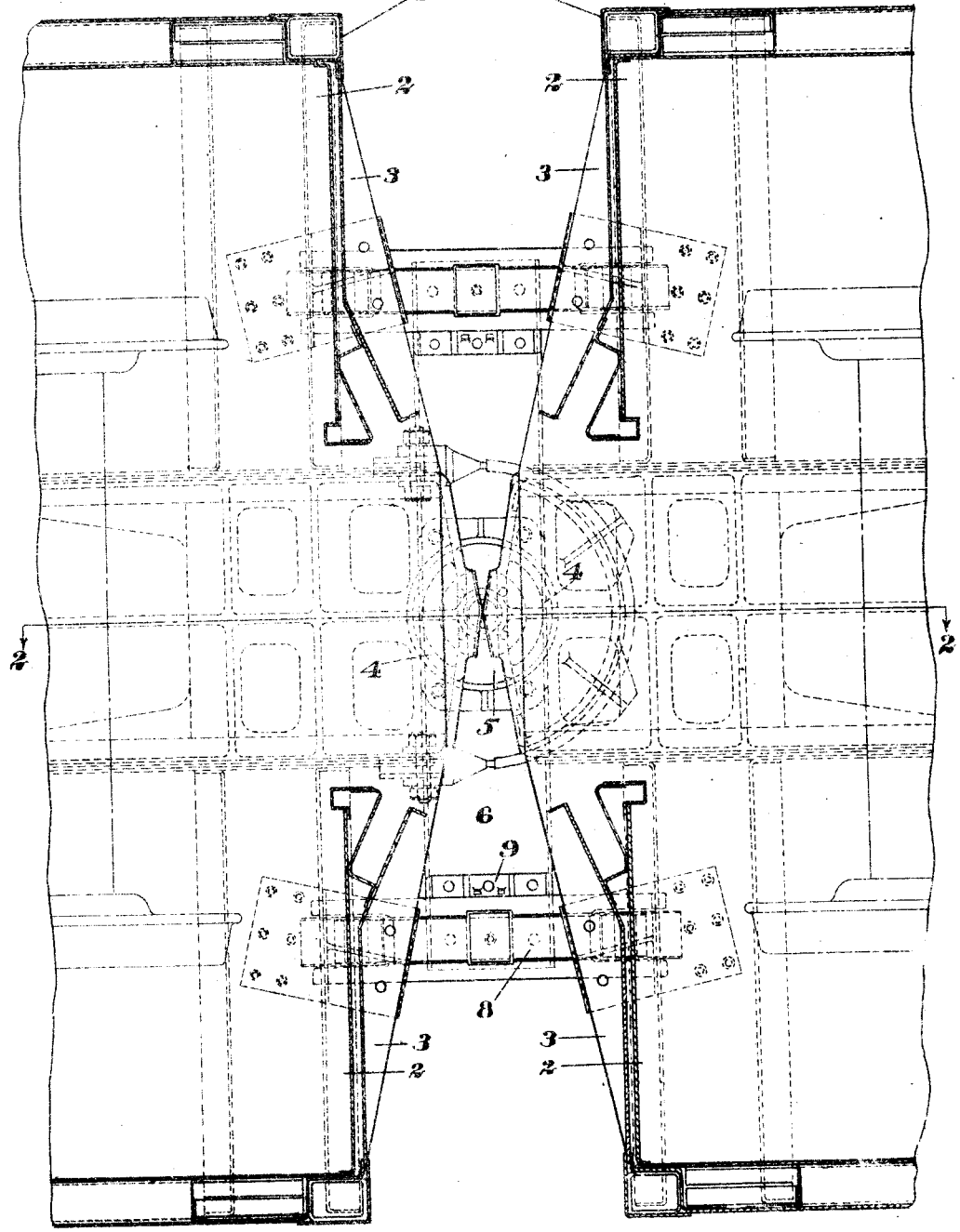
Figure 2:
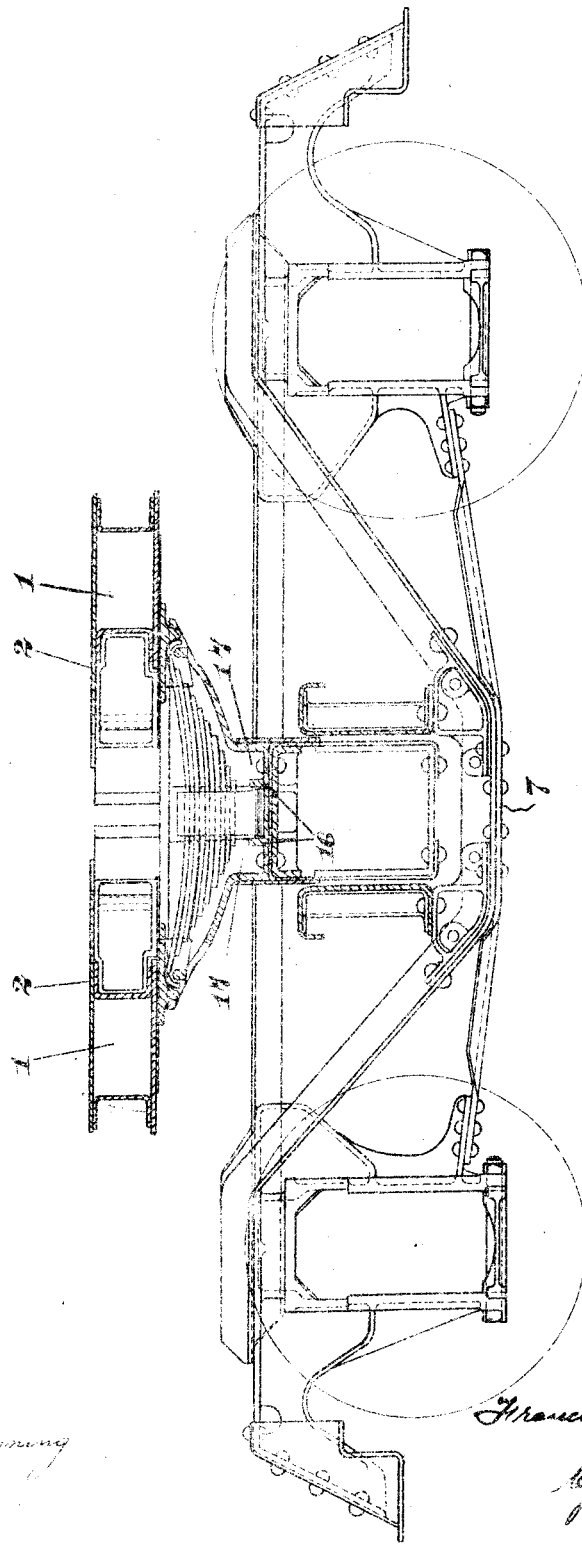

Referring to the drawings in which like reference characters refer to like parts, Fig. 1 is a plan view of a portion of the adjacent ends of two bodies of an articulated car embodying the invention; Fig. 2 is a longitudinal sectional view taken on the line 2—2 of Fig. 1; Fig. 3 is an enlarged plan view of the truck side bearing; Fig. 4 is a side elevational view of the same; Fig. 5 is an end elevational view of the same, a portion of the truck bolster being shown; Fig. 6 is a sectional view of the same taken on the line 6—6 of Fig. 4, a portion of the truck bolster being shown; Fig. 7 is a longitudinal sectional view through one of the end portions of a truck side bearing illustrating a modification of the invention; Fig. 8 is a sectional view of the same taken on the line 8—8 of Fig. 7 and Fig. 9 is a sectional view of the same taken on the line 8—8 of Figure 7, the side bearing shoe being shown supported by the side bearing base member.

Referring now in detail to the drawings the reference character 1 indicates an articulated car unit which comprises a plurality of car bodies 2, the adjacent end portions 3 of two of which have been shown in the drawings. These ends 3 are provided with body center plates 4 both of which engage a truck center plate 5 mounted on a truck bolster 6 which bolster is a part of a truck 7. The center plates 4 and 5 are so formed that they engage with each other in such a manner as to permit the bodies 3 of the unit to move freely relative to each other and to the truck as the unit rounds a curve or when the bodies sway from side to side. On each side of the longitudinal center line of the bodies 2 a side bearing member 8 is provided which intermediate its ends is seated in a support or base 9 secured to the truck bolster 6, such support or base forming part of the side bearing.

The base members 9 are secured to the bolster and extend on each side thereof in directions longitudinally of the car to positions under the adjacent car bodies. These base members do not contact with the bodies when the car is being operated under normal service conditions, but should one or more of the members 8 become weakened or broken the body or bodies will move downwardly into contact with and be supported by the members 9 and these members will function as side bearings until such time as the members 8 which might be damaged, can be replaced. It will here be noted that the base members 9 are safety devices in that they do not, in case of accident, permit the bodies to drop on the top of the truck where they would be inoperative and where they might cause a serious accident with the consequent injury or loss of life to passengers.

Each of these members 9 is hollow having a bottom 10, spaced sides 11 and end walls 12, all of which are preferably integral. The side walls 11 extend vertically some distance above the bolster 6, and longitudinally they preferably extend on each side of the bolster a sufficient distance that their end portions 13 are under the adjacent ends of the bodies but are of such a height that they are not in engagement therewith under normal service conditions.

The side bearing members 8 extend between the adjacent ends of adjacent bodies and each preferably comprises a spring made up of a plurality of spring plates 14 of varying lengths which are securely held together, one on top of the other, through the medium of a spring band 15. The lower portion of this spring band extends between spaced upwardly extending lugs 16 formed on the bottom 10 of the member 9, and below the upper edges of such lugs, this band rests on shims 17 arranged between the lugs, which shims may be removed or replaced through an opening 18 formed in one of the sides 11. It will be understood that in some cases these shims may be omitted and the lower portion of the spring band may rest directly upon the bottom 10 between the lugs 16. The inner surfaces of the sides 11 on both sides of the center of their length are offset to form channels 18 which channels vary in width from their narrowest portions adjacent the bottom 10 to their widest portions above the bottom 10. These channels 18 are for the reception of the sides of the spring bands 15 and when the side bearing member 8 is mounted in the base member 9, it will be permitted to cant or rock slightly in the direction of its length and yet will not become accidentally separated from the base 9.

The end portions of each of the side bearing members 8 extend above the upper edges of the sides 11 of the base member 9 and have mounted on such portions, shoe members 19, the upper surfaces of which are adapted to be engaged by the ends of the adjacent car bodies. These shoe members rest on the member 8 and are permitted to rock relative thereto in the direction of the length of the member. Each of the shoe members is provided with sides 20 which extend downwardly between the sides 11 of the base 9 and are adapted to cooperate with said sides 9 to prevent sidewise movement of the shoe relative to the member 8. The sides 11 are offset to form shoulders or stops 21 which are adapted to be engaged by the shoe members should they, for any reason, move too far in directions toward each other. The upper spring plate is provided with downwardly curved end portions 22 which are adapted to engage transverse portions 23 of the shoes and by such engagement prevent the shoes from moving in directions away from each other.

It will be noted that as the side bearing members 8 are resilient, and loosely mounted on the truck, and that the shoe members 19 are pivotally mounted on the members 8, and are held against excessive longitudinal movement, a proper bearing between the adjacent car bodies and the truck is insured at all times and under all service conditions.

In Figs. 8 and 9 a modification of the invention is illustrated in which each of the shoe members 19, in the event of the failure of the side bearing member, will rest upon and be supported by the members 9 in such a manner that the bearing surfaces of the shoe members will be slightly higher than the upper surfaces of the member 9, so that these bearing surfaces are adapted to be engaged by the bearing surfaces on the bodies, and thus support the ends of the bodies.

It will also be noted by those skilled in the art to which this invention appertains that changes may be made in the details of the several parts forming the invention without departing from the spirit and scope of the appended claims.

Having thus described the invention what I claim as new and desire to secure by Letters Patent is:—

1. In an articulated car comprising a plurality of car bodies, a truck pivotally connected with the adjacent ends of said bodies, a side bearing member mounted on said truck, adapted to extend between and be engaged by said ends, and a side bearing member adapted to support said ends in the event of the failure of the first mentioned member.

2. In an articulated car comprising a plurality of car bodies, a truck supporting the adjacent ends of two of said bodies, a side bearing member on said truck adapted to be engaged by said ends under normal service conditions and a side bearing member adapted to support said ends in the event of the failure of the first mentioned side bearing member.

3. In an articulated car comprising a plurality of car bodies, a truck for supporting the adjacent ends of two of said bodies, a resilient side bearing member adapted to be engaged by both of said ends under normal service conditions, and a rigid side bearing member adapted to support said bodies in the event of the failure of the first mentioned side bearing member.

4. In an articulated car comprising a plurality of car bodies, a truck for supporting the adjacent ends of two of said bodies, and a side bearing between said bodies and truck, said side bearing comprising two members, one mounted in the other and either being adapted to support said bodies.

5. In an articulated car comprising a plurality of car bodies, a truck for supporting the adjacent ends of two of said bodies, a hollow side bearing member mounted on said truck and extending beneath said ends, and a side bearing member loosely mounted in said hollow side bearing member and engaging with said ends.

6. In an articulated car comprising a plurality of car bodies, a truck supporting the adjacent ends of two of said bodies, a side bearing member mounted on said truck and extending beneath and in the plane of said bodies, and a side bearing member mounted on the first mentioned side bearing member in engagement with said ends.

7. In an articulated car comprising a plurality of car bodies, a truck supporting the adjacent ends of two of said bodies, a side bearing member on said truck adapted to extend across the space between said bodies, a side bearing member mounted on the first mentioned side bearing member and extending thereabove into engagement with said ends.

8. A side bearing for the adjacent ends of two bodies of an articulated car comprising two members, one mounted on the other and both extending into the vertical plane of said bodies, one of said members extending above the other and engaging with said ends.

9. A side bearing for the adjacent ends of two bodies of an articulated car, comprising a member mounted on a supporting truck and extending into the vertical plane of said ends but out of contact with said bodies, and a member mounted on the first mentioned member and engaging with said bodies.

10. A side bearing for the adjacent ends of two bodies of an articulated car comprising a member secured to a supporting truck and having portions extending into the plane of, but not in contact with, said ends, and a member loosely mounted in the first mentioned member and engaging said ends.

11. In an articulated car comprising a plurality of car bodies, a truck for supporting the adjacent ends of two of said bodies, and a side bearing on said truck adapted to engage said bodies, said side bearing comprising a member having hooked end portions, and shoe members loosely mounted on said member and engaged by said hooked portions.

12. In an articulated car comprising a plurality of car bodies, and a side bearing extending between the adjacent ends of two of said bodies, said side bearing comprising a resilient member and a rigid member, both of said members extending beneath both of said ends.

13. In an articulated car comprising a plurality of car bodies, a truck supporting the adjacent ends of two of said bodies, a side bearing for said ends mounted on said truck, said side bearing comprising a rigid part and a resilient part, said resilient part being in engagement with said ends and said stationary part being adapted to support said ends in the event of the failure of said resilient member.

14. In an articulated car comprising a plurality of car bodies, a truck supporting the adjacent ends of two of said bodies, a side bearing for said ends mounted on said truck, said side bearing comprising a rigid portion and a resilient portion, and shoe members mounted on said resilient portion and slidably mounted in said rigid portion.

15. In an articulated car comprising a plurality of car bodies, a truck supporting the adjacent ends of two of said bodies, a side bearing for said ends mounted on said truck, said side bearing comprising a rigid member, a resilient member mounted in said rigid member and shoe members on said resilient member movable relative to said member, said rigid member forming guides for said shoe members.

16. In a side bearing for an articulated car comprising a rigid part, a resilient part mounted in said rigid part, a hook shaped part on said resilient member, a bearing shoe mounted on said resilient member and engaged by said hook shaped portion to prevent longitudinal movement of said shoe in one direction, offset portions on said shoe and rigid member adapted to cooperate to prevent longitudinal movement of the shoe in the opposite direction, and portions on said shoe and rigid member adapted to cooperate to prevent transverse movement of said shoe.

In testimony whereof I affix my signature.

FRANCIS McF. BRINCKERHOFF.